MAGNETIC AMPLIFIER

Filed July 6, 1954

INVENTOR.
EDWARD L. GARDNER
BY William P. Lane
ATTORNEY

United States Patent Office 2,812,391

Patented Nov. 5, 1957

2,812,391

MAGNETIC AMPLIFIER

Edward L. Gardner, Downey, Calif., assignor to North American Aviation, Inc.

Application July 6, 1954, Serial No. 441,459

5 Claims. (Cl. 179—171)

This invention relates to magnetic amplifiers particularly those utilizing mechanical switches.

Magnetic amplifiers offer several advantages over electron tube amplifiers. These advantages are ruggedness, a minimum of maintenance, and long life. However, there are several disadvantages inherent in most magnetic amplifier circuits which prevent their universal replacement of electron tube circuits. One of these disadvantages is the relatively long time response of most magnetic amplifiers. The delay in a magnetic amplifier may amount to as much as several cycles of the supply source. Generally, it may be described as due to the length of time required to drive a magnetic core back into saturation. Another objection to magnetic amplifiers, in certain instances, is their low input impedance. The input impedance of a vacuum tube amplifier may be substantially infinite, whereas the input impedance of a magnetic amplifier is usually low for various reasons. Low impedance devices require more power from their signal sources. The device of the invention is directed to overcoming these objections and to improving the time response of a magnetic amplifier and increasing the input impedance as viewed from the signal source.

It is therefore an object of this invention to provide an improved magnetic amplifier utilizing mechanical switching.

It is a further object of this invention to provide an improved magnetic amplifier having improved time response.

It is a further object of this invention to provide a magnetic amplifier having an increased input impedance.

Other objects of invention will become apparent from the following description taken in connection with the accompanying drawings, in which—

Figures 1, 2, 3, 4:
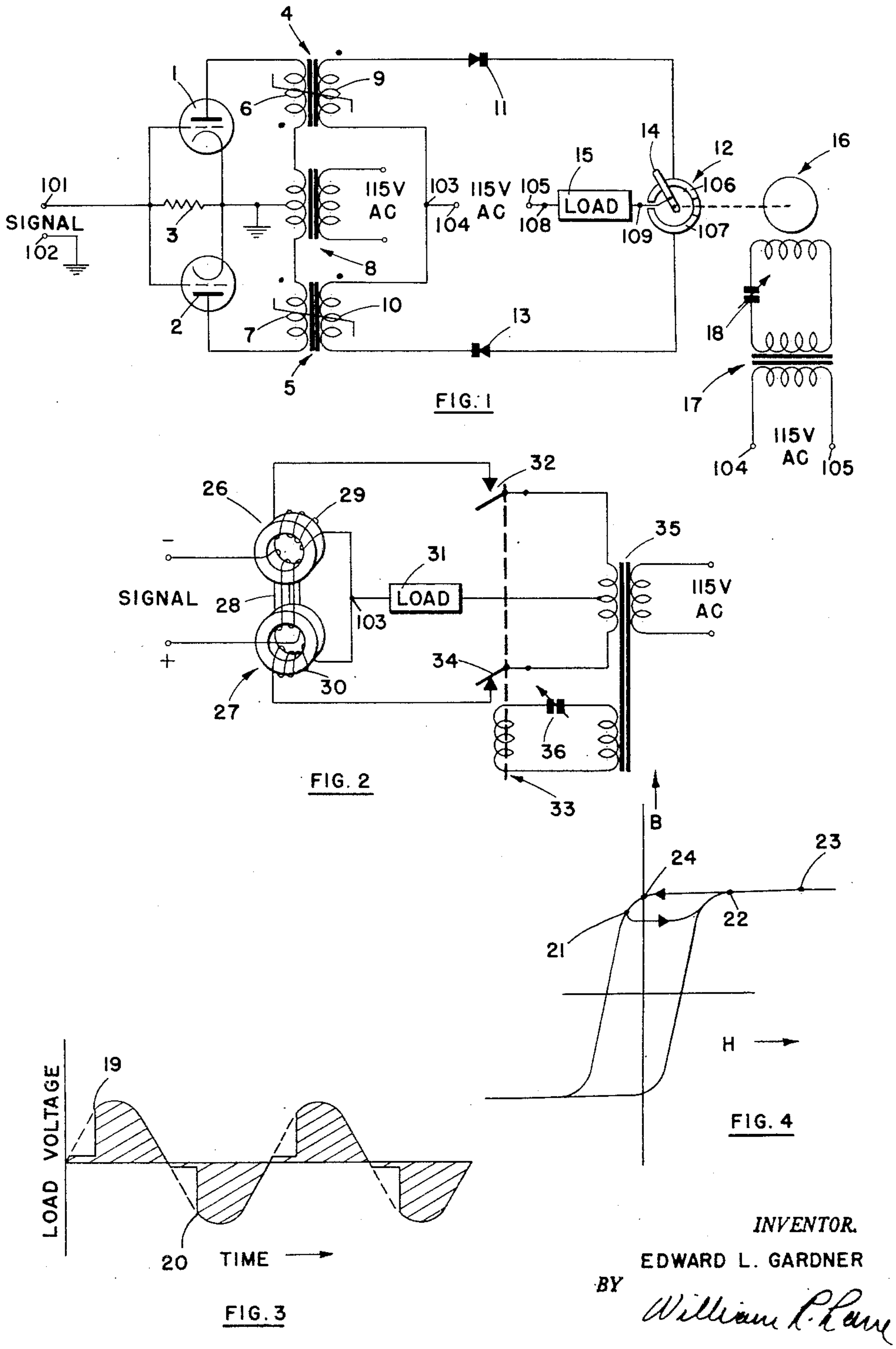
Fig. 1 is a schematic of an A.-C. output magnetic amplifier utilizing a rotating switch.
Fig. 2 is a schematic diagram of a D.-C. amplifier using a synchronous type vibrator switch.
Fig. 3 is a supply source wave form indicating saturable reactor firing angles.
Fig. 4 is a representation of a typical B–H curve, also known as a hysteresis curve of the saturable cores of Figs. 1 and 2.

Referring now to Fig. 1, control of the magnetic amplifier is provided by a D.-C. signal applied to signal input terminals 101 and 102 and received at the grids of tubes 1 and 2. Grid return resistor 3 connects both grids to the cathodes which are connected to the center tap of the secondary of transformer 8. Saturable reactors are well known in the art, employing cores of high permeability, low coercive metal such as iron and nickel alloy or grain-oriented silicon steel. The primary of transformer 8 is connected to A.-C. line supply to provide plate voltage for tubes 1 and 2. Load windings 9 and 10 of saturable reactors 4 and 5 are connected in series and their common connection 103 is connected to one side of the 115 volt, A.-C. supply having a pair of terminals 104 and 105. The polarity dots indicate that currents flowing into the load and control winding at the dots cause the same polarities in saturable reactor 4. The same is true of saturable reactor 5. There is a mechanical switch 12 having distinct, stationary contact segments or half-rings 106 and 107 insulated from each other, and a rotatable switch arm 14 cooperating with the stationary contacts 106 and 107. Load winding 9 is connected through diode 11 to the stationary contact 106 of mechanical switch 12. Load winding 10 is connected through diode 13 to the other stationary contact 107 of switch 12. The switch arm 14 is connected to load 15 having terminals 108 and 109 and is rotated to touch first one contact and then the other, connecting the load 15 first to diode 11, then to diode 13. The terminal 108 of load 15 is connected to the terminal 105 of the 115 volt, A.-C. supply. Arm 14 is rotated by synchronous motor 16 which is driven by transformer 17 connected to the same 115 volt A.-C. supply connected to terminals 104 and 105. Capacitor 18 provides for adjustment of the phase of motor 16 for causing arm 14 to pass from one contact to another at optimum instances to minimize sparking. It can be seen that load 15 receives current in one direction from diode 11 and in the reverse direction from diode 13. This amplifier, therefore, provides A.-C. output.

During a first half cycle of the line supply, reactor 4 is driven into saturation at an instant represented at 19, Fig. 3. At this time load winding 9 becomes a short circuit and current flows through diode 11 and switch 12 and arm 14 to load 15. The instant at which each reactor fires is comparable to the well-recognized firing angle of thyratron circuits. The amount of control current flowing in control winding 6 determines the instant during the cycle at which the core saturates and current commences to flow. Consequently, the control current in winding 6 determines the average output power of load winding 9.

Similarly, during the next half cycle, saturable reactor 5 fires, at instant 20, and load winding 10 becomes a short circuit; and current flows through diode 13, switch 12 and arm 14 to load 15. The instant at which saturable reactor 5 fires is determined by the amount of control current flowing in control winding 7.

Referring to Fig. 4, which may be considered to be the hysteresis loop of either reactor core, it is assumed that the flux state of the core is represented to be at point 21. As the A.-C. supply frequency commences to drive the load winding, the state of the core moves from point 21 to saturation at point 22 (at which time the load winding is substantially a short circuit), to some extended point 23 on the saturation curve, and then back to point 24 at which point the power supply cycle reverses polarity and no current is caused to flow through load winding 9. The height of point 24 along the ordinate axis is called the remanence of the core material and indicates the amount of volt-seconds which must be replaced in the core of reactor 4 before it fires in each cycle. The volt-seconds required determines the time response of the reactor. In conventional magnetic amplifier circuits, when the line voltage has reversed and back voltage is placed across the diodes, a certain amount of conduction will occur, and this results in further desaturation of the core to point 21, for example. Such a condition indicates that even more volt-seconds must be furnished to reactor 4 to cause it to fire again and a longer time response will result. The use of a mechanical switching device in place of diodes can minimize the further desaturation from point 24 to point 21 by positively interrupting the circuit during desaturation intervals so there is no electrical connection which allows current to flow to desaturate the cores. If switch 12 is a break-before-make switch, diodes 11 and 13 may be dispensed with entirely, their function being substantially accomplished by mechanical switch 12. However, in a specific embodiment of the device, mechanical switch 12 is a make-before-break type switch in order to minimize the sparking. Diodes 11 and 13 are employed to further minimize desaturating currents in the load windings of the saturable reactors.

The obtaining of a high input impedance may be considered from a different aspect considering saturable reactor 5 as being unsaturated, reactor 4 as having fired and presently conducting. The core of reactor 5 is being reset down into the hysteresis curve by current control winding 7 as previously explained. The term "reset" denotes a change of flux level from saturation toward saturation in the opposite direction caused by current in the control winding. As the core departs from saturation, reactor 5 becomes substantially a transformer and a voltage is induced in load winding 10 by reason of current flowing in control winding 7. It is this voltage in load winding 10 which may operate to allow conduction by diode 13, resulting in current flow in load winding 10 effecting the core of saturable reactor 5 adversely to the resetting being accomplished by control winding 7. This adverse effect is an additional load so far as tube 2 is concerned and makes reactor 5 a low impedance circuit because of the heavy drain of current on the signal source. The use of mechanical switch 12 substantially removes this action, winding 10 being disconnected from the load during the time reactor 5 is being reset by control winding 7.

If load 15 is substantially resistive, switch 12 can be made to "make and break" at times when voltage and current are substantially at their lowest values and a minimum of sparking will occur. Load 15, however, may be reactive, but it is desirable from the standpoint of arcing that the current and voltage be not too far out of phase with each other.

Whereas, in the device, of Fig. 1, saturable reactors 4 and 5 are isolated with respect to each other, having separate control windings, reactors 26 and 27 in Fig. 2 have a single control winding 28 interlinking cores 26 and 27. The direction of the windings, as indicated, is such that control winding 28 acts to reset reactors 26 and 27, or oppose each load winding polarity caused by the flow of load currents therein. Load windings 29 and 30 are connected together at one terminal of load 31. Load winding 29 is connected at its other terminal to switch 32 of synchronous switch 33. Load winding 30 is connected to switch 34 of synchronous switch 33. The line source is coupled into the circuit by transformer 35 whose first secondary is connected at one end to switch 32 and at the other end to switch 34 and at its center tap to load 31. In order that the action of synchronous switch 33 synchronizes switches 32 and 34 with the supply frequency, it is connected to be operated from a second secondary of transformer 35. Capacitor 36 provides for a phase shift to allow proper synchronization of the switching action of the switch with the supply frequency. The switches 32 and 34 each make at the instant the other is breaking. The circuit of Fig. 2 is advantageous in that the action of switches 32 and 34 when they are respectively open is to prevent current from flowing in the load windings of the reactors during those times in which the reactors are not saturated. During desaturation of each core, the reactor acts as a transformer and current flowing in the load winding is reflected into the control winding. Disconnecting the load windings from the circuit of the magnetic amplifier prevents undesired currents from flowing in the load windings. In distinguishing between the mechanical switch and the diode rectifier used in other instances, the flow of current in each load current loop is not commenced or terminated according to voltages in the load circuit loop but is commenced and terminated according to switching action of separate synchronizing means, namely the synchronized switch. Further, as in the case of the illustration of Fig. 1, the time response of the magnetic amplifier is lessened both in turning on and turning off according to the D.-C. signal input.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A magnetic amplifier comprising a plurality of saturable reactors, each said saturable reactor comprising a load winding and a control winding, signal input terminals, means operatively connecting said signal input terminals to said control windings, terminals for connection to a load, conductors serially connecting each such load winding to the load terminals to form a load circuit, a rectifier in each such load circuit, connections interposed in such load circuits for supplying alternating-current power having a line frequency and mechanical switch means operated at line frequency of such alternating-current power, said switch means being connected in the load circuit of each saturable reactor.

2. A magnetic amplifier comprising signal-receiving terminals, a plurality of saturable reactors each comprising a saturable core, a control winding, coupled to said signal-receiving terminals, and a load winding, a rectifier in series with each load winding an alternating-current power source, supplying current reversing in cycles for reversing magnetization in each saturable core during intervals in such cycles and thereby resetting said cores in said intervals, mechanical switch means having contacts, each serially connected with one of said load windings, means connected to said alternating-current power source operating said mechanical switch means at power supply frequency and synchronized to break each load circuit substantially during the interval when its respective saturable core is being reset.

3. In a magnetic amplifier, signal-receiving terminals, a pair of saturable reactors, each comprising a saturable core, a control winding coupled to said signal-receiving terminals, and a load winding, terminals for connection to a load, terminals for connection to an alternating-current power supply having a frequency, means operatively connecting each load winding to said supply and load terminals to form a load circuit, rectifying means in such load circuit, make-before-break mechanical switch means disposed to complete one of said load circuits and interrupt the other of said load circuits, and means operating said mechanical switch means at the power supply frequency.

4. In a magnetic amplifier, signal-receiving terminals, a pair of saturable reactors each having a saturable core, a load winding, and a control winding connected to said signal-receiving terminals, rectifying means disposed in operation relative to each said load winding, terminals for connections to a load, an alternating-current power source supplying current reversing in cycles for reversing magnetization in each saturable core during intervals in such cycles and thereby resetting said cores in said intervals, means operatively connecting each said load winding to said load terminals and said alternating-current power source to form a load circuit, make-before-break mechanical switch means disposed to complete alternately one of said load circuits and thereafter interrupt the other of said load circuits, and means operating said mechanical switch means in synchronism with said power source, said switch means synchronized so as to interrupt each load circuit when its respective saturable core is being reset.

5. A magnetic amplifier comprising signal-receiving terminals, a plurality of saturable reactors, each having a saturable core, a load winding and a control winding connected to said signal-receiving terminals, terminals for connection to an alternating-current power source supplying a current wave with reversing cycles, rectifying means disposed in operative serial relation with each said load winding to cause lack of symmetry of the current wave therein, load terminals, means operatively connecting each load winding to the load and power source terminals to form a load circuit and make-before-break mechanical switch means disposed to complete alternately the load circuit of one load winding and the load circuit of the other load winding as the cycle of the alternating-current power supply of said magnetic amplifier reverses.

References Cited in the file of this patent

UNITED STATES PATENTS 2,569,468 Gaugler ---------------- Oct. 2, 1951